United States Patent Office 3,400,447
Patented Sept. 10, 1968

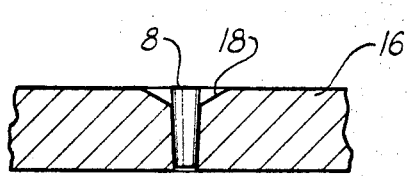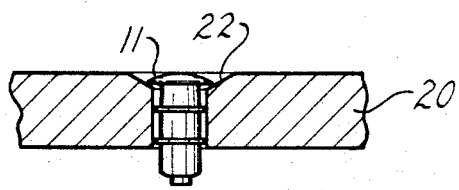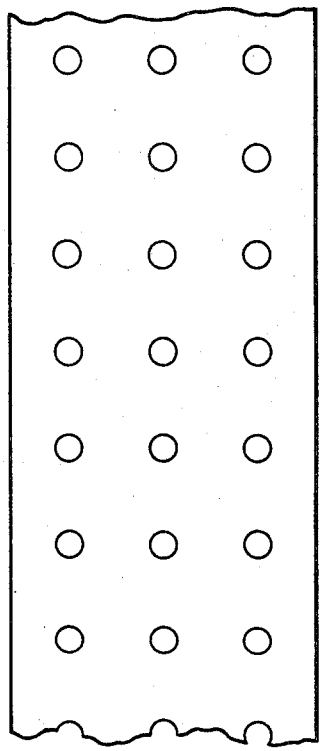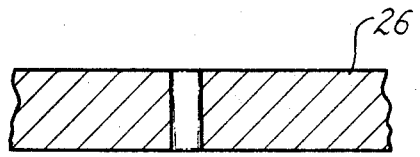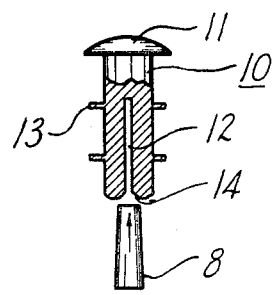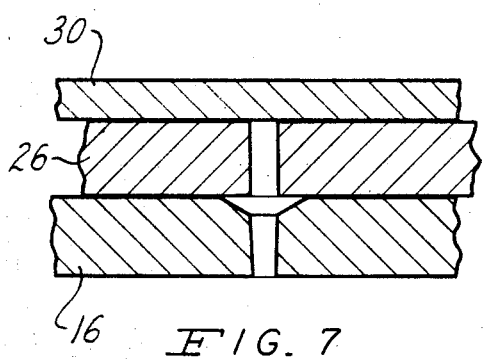

3,400,447
METHOD AND APPARATUS FOR ASSEMBLY OF TIRE STUDS
Bernard A. Woods, Jr., and Robert Martin Woods, Pittsburgh, Pa., assignors to Aluma-Grip Company of America, Inc., Pittsburgh, Pa., a corporation of Pennsylvania
Filed July 23, 1965, Ser. No. 474,241
10 Claims. (Cl. 29—467)

ABSTRACT OF THE DISCLOSURE

This invention comprises process and apparatus for production of carbide pins for studding of tires whereby tungsten carbide pins are assembled into the cases by a process employing a number of plates. One of the plates is operated in a vibrating manner to receive and orient tapered tungsten carbide pins in a plurality of holes over its surface. Another plate having a plurality of holes therethrough disposed opposite the holes in the first plate when the two plates are in juxtaposition, is employed to orient the cases prior to the actual assembly process and to control the position of the cases during the assembly process. The use of these plates together with use of various other plates supplies a process for the rapid assembly of components.

---

Our invention relates to vehicle tire traction studs and more particularly to method and apparatus for assembly of bimetal tire studs.

In accordance with the prior art of which we are aware, vehicle tire studs for insertion in the tread of a vehicle tire have been designed comprising an outer case of material such as aluminum having retained therein and extending therefrom a pin of a harder material such as tungsten carbide. The cases are built with a small longitudinal hole therethrough and the pins are then driven into the holes. These pieces were assembled by hand by placing one of the cases on a solid object with the nose of the case up and then, by holding the pin upright between the fingers, the pin was then driven into position by a hammer. Realizing that this procedure was too slow and time consuming, many attempts were made to develop apparatus whereby one of the cases could be fed in an upright manner into a press while at the same time mechanical "fingers" carried the pins into the press and positioned the pin directly above the center hole in the case and the carbide pin was struck with a press pin to drive it into position. Since the pins are tapered with their smallest diameter entering the case first, the pins could be easily carried to the press by dropping them into a properly sized hole. However, in pressing the pin into the case, the entire pin would have to pass through its conveyor and, as it was driven through the hole in its conveyor, it would cause expansion of the hole. The conveyor for the pins therefore had to be made of some type of resilient material or apparatus which would not be permanently deformed by the action of the pin passing through. Also, it was found that to obtain a volume of production it was necessary for the press to operate at a rapid speed so that the press pin would strike the tungsten carbide pin with a hammer-like blow driving it quickly into place. It was found that if any oil were present on the pins or in the hole in the cases, an explosion would occur within the cases due to the pressure and temperature produced by the press in the case as the pin was driven into place. This then caused the pins to jump out of the cases as soon as the pressure on the cases was released. Also, many other factors presented problems, such as jamming, difficulties of control, and extreme wear on the press pins. Many attempts were made to rectify these problems so as to correct the apparatus and make it operable without success until finally it was recognized that the problems presented were unsolveable and it was decided to junk the entire apparatus and look for a new solution.

It is therefore an object of our invention to provide a method and apparatus for the assembly of tungsten and carbide pins with aluminum cases to form studs for automobile tires.

It is still another object of our invention to provide method and apparatus for assembling bimetal tire studs with high speed and high efficiency.

It is still another object of our invention to provide a practical method and apparatus for the assembly of tungsten carbide pins into aluminum cases for the formation of tire studs.

It is another object of our invention to provide an improved process and apparatus for the assembly of manufactured parts.

In accordance with our invention as will be hereinafter set forth more fully, we assemble the tungsten carbide pins into the cases by a process employing a number of plates. One of the plates is operated in a vibrating manner to receive and orient tapered tungsten carbide pins in a plurality of holes over its surface. Another plate having a plurality of holes therethrough disposed opposite the holes in the first plate when the two plates are in juxtaposition, is employed to orient the cases prior to the actual assembly process and to control the position of the cases during the assembly process. The use of these plates together with use of various other plates supplies a process for the rapid assembly of components.

The following is a detailed description of our invention from which the reader may more clearly gain an understanding of the principles involved when read in connection with the accompanying drawing in which:

FIGURE 1 is a plan view of an intermediate plate in accordance with our invention demonstrating the general relative location of the holes in the plates.

FIGURE 2 is a plan view partially in section of a case in accordance with our invention and a pin in position to be driven into said case.

FIGURE 3 is a cutaway cross sectional view of a pin shaker plate in accordance with our invention showing the configuration of the pin shaker plate and the manner in which the pins fit into the plate.

FIGURE 4 is a cutaway sectional view of a case shaker plate in accordance with our invention showing the configuration of the holes in the shaker plate and the position of a case in the shaker plate.

FIGURE 5 is a cutaway cross sectional showing of an assembly plate in accordance with our invention demonstrating the configuration of the assembly in accordance with one embodiment of our invention.

FIGURE 6 is a cutaway cross sectional showing of an intermediate plate in accordance with our invention demonstrating the configuration of the holes in the intermediate plate.

FIGURE 7 is a cutaway showing in section of a back up plate, an intermediate plate and a pin shaker plate in position with respect to each other demonstrating the manner in which plates in accordance with our invention are placed together.

In accordance with our invention, we employ a small tungsten carbide pin 8 being round and slightly tapered so that one end is slightly larger in diameter than the other end so that it is essentially in the form of a truncated cone. These pins 8 are to be inserted into aluminum cases 10 having previously drilled axial holes 12 therein of a diameter less than the smaller diameter of said pins and having a slight bevel 14 at the entrance to the holes for receiving the pins.

In accordance with a preferred embodiment of our invention, the pin 8 is approximately eight millimeters in length and approximately two millimeters in diameter. An aluminum case 10 is provided comprising a rivet-like configuration with an elongated shank and an enlarged head 11 on one end thereof. Along the shank we provide a plurality preferably two, thin annular rings 13 extending outward from the shank to a diameter slightly less than the diameter of the enlarged head on the shank. In the nose of the shank, which is the end of the case opposite to the end on which the head 11 is located, we provide an axial hole 12 extending into the shank approximately seven millimeters. This hole 12 through the shank has a diameter substantially less than the smallest diameter of the pin. Thus the hole through the shank is not constructed to fit the outer diameter of the pin but instead is provided as a means of guiding the pin so that when the pin 8 is driven into the shank of the case 10, it will follow the direction of the hole 12 and will be located on the axis of the case. The mouth of the nose of the case is provided with a beveled edge 14 around the axial hole therein which provides a funnel recess for receiving and guiding the pin toward the center of the shank so as to place the pin in position in the shank to expedite seating the pin in the nose of the case.

In accordance with the preferred embodiment of our invention, we provide a carbide shaker plate 16 which shaker plate comprises a flat piece of rigid material such as steel, having therein a plurality of holes which are arranged according to a regular and predetermined pattern. Each of the said holes may be tapered along its length to correspond to the taper of the pins so as to be slightly larger at the entrance end than at the other end. A beveled recess edge 18 is provided at the entrance to each of the said holes. The holes through the plate are dimensioned so that when one of the tungsten carbide pins is inserted in said hole, with the pins oriented so that the taper of the holes corresponds to the taper of the pins, the carbide pins will readily rest in the holes but will not slip through the holes. Thus, the carbide shaker plate may have its holes filled with tungsten carbide pins by a simple shaking process. A plurality of carbide pins are placed on top of a shaker plate, which plate has been oriented with the beveled edges of the holes on the upper side, and the shaker plate is then shaken or vibrated. As the shaker plate is vibrated, the tungsten carbide pins will randomly fall into the beveled openings with one end thereof toward the tapered hole through the plate. If the small end of the tungsten carbide pin is toward the tapered hole, the tungsten carbide pin will drop into the hole where it is held in place. If, however, the large end of the tungsten carbide pin is toward the entrance to the tapered hole, then the tungsten carbide pin cannot enter the hole.

A second plate is provided, known as a case shaker plate 20 for sorting, locating and retaining the aluminum casings. The case plate comprises a plurality of holes which are located in accordance with the same pattern as the holes in the pin shaker plate. Each of these holes is provided with a beveled mouth or entrance 22 on one side of the plate for funneling cases which are jostled into that region into the case holes preferably the diameter of the bevel is greater than one-half the length of the pin. Since the head on the case is larger than the body of the case, therefore, if the case falls into a position such that the head of the case is oriented against the entrance to the hole, then the case will not be received by the hole. If, however, the smaller end or nose of the case is oriented toward the hole when it falls into the bevelled entrance way, it will drop easily into the hole and be retained in the hole.

We provide an assembly plate 24 for holding the tungsten carbide piece pins in an upright position with one end of the tungsten carbide pins seated in the mouth of each of the cases during the final assembly or pressing process. The assembly plate comprises a flat piece of rigid material having a plurality of holes therethrough, each of which is of varying cross sectional size along its length. The assembly plate holes have a large diameter identation or enlargement of each hole at the mouth of each hole extending partly through and conforming in diameter to the outside diameter of the nose ends of the cases 10 so as to receive the nose end of the cases 10. The small diameter portion of the hole through the assembly plate is of a diameter corresponding to the largest diameter of the pins 8. Thus, the assembly plate fits over the nose of the cases 10 and helps to retain the tungsten carbide pins 8 in an aligned position with respect to the cases and to retain the cases in an upright position and also serves to help control the depth to which the pins are pressed during the assembly process which is accomplished by a pressing action. The length of the small diameter portion of the holes through the assembly plate is equal to the distance which a tungsten carbide pin 8 in the finished product extends out of its aluminum case 10.

We also provide an intermediate plate 26 which is used for transfer purposes in accordance with the preferred processes of my invention. The intermediate plate has a plurality of holes therethrough having a cross sectional diameter slightly greater than the largest cross sectional diameter of the pins 8. The holes through the intermediate plate are organized in a predetermined pattern to correspond to the holes through the tungsten carbide pin shaker plate 16 and the holes through the case plate 20 and the assembly plate 24. Thus, the four plates are congruent in the sense that when the four plates are placed together with their flat surfaces parallel and touching, the axes of the holes in each of the plates will correspond to the axes in the holes of each of the other plates.

In accordance with our invention, the plates described herein may be of relatively small size, such as plates with thirteen rows of thirteen holes, e.g., 169 holes, or they may be much larger. Also, the plates may be parts of continuous belts. In the case of a continuous belt, the term "plate" refers to a segment of the belt.

In accordance with the process of our invention, we organize the carbide pins 8 in the carbide plate 16, also referred to as the shaker plate or carbide pin plate, by a shaking process. Approximately 20% more pins 8 are placed on the carbide shaker plate 16 than the number of holes in the carbide shaker plate. The shaker plate is then shaken so as to give a random motion to the pins with respect to the shaker plate. As a pin 8 falls into the bevelled recess 18 at the entrance to one of the holes in the shaker plate, one end of the pin will come in contact with the entrance to the hole through the shaker plate. If the large end of the pin is toward the mouth of the hole, the pin will not enter the hole but instead will be subsequently shaken out of the beveled recess and will be caused to move around randomly again. If, however, the small end of the pin 8 contacts the entrance to the hole in the shaker plate 16, the pin will fall into the hole and will be retained therein. By using approximately 20% more pins than the number of holes through the shaker plate, substantially all of the holes in the shaker plate will be filled with pins after a few seconds of shaking and the remaining pins may be brushed aside. The pins are now oriented in the shaker plate with their points downward. It is therefore necessary that they be removed from the shaker plate and effectively reversed in direction while retaining their relative orientation to each other. The intermediate plate 26 is therefore placed on top of the carbide pin shaker plate 16 so that the holes in the intermediate plate 26 are oriented to correspond with the holes in the carbide pin shaker plate. A back up plate 30 comprising a flat piece of rigid material such as steel is then placed on top of the intermediate plate so as to prevent the pins from falling through the holes in the intermediate plate when the plates are turned upside down. After the back up plate 30 is placed on top of the intermediate plate 26, the carbide pin shaker plate 16 and the intermediate plate 26 and the back up plate 30 together as a unit are inverted so that the carbide pin shaker plate 16 is on top and the pins are allowed to fall out of the shaker plate into the holes in the intermediate plate 26. The carbide pin shaker plate is now removed exposing the pins which are located in the holes in the intermediate plate and extend outward beyond the surface of the intermediate plate.

The assembly plate having the holes enlarged at one end so as to correspond to the nose of the case pieces is now placed on top of the intermediate plate so that the holes through the assembly plate correspond to the holes in the intermediate plate and oriented so that the enlarged portions of the holes of the assembly plate are on the upper side with the pins extending from below up through the intermediate plate through the small holes in the assembly plate and into the large portions of the holes in the assembly plate.

The cases 10 are assembled into the case plate 20 by a shaker process similar to that employed with the carbide pins. Since the heads 11 on the cases 10 are larger than the holes through the case plate 20, the heads of the cases will not enter those holes. However, when the nose of a case approaches one of the holes in the case plate, it finds a free passageway and the case falls into the hole in the case plate in a position such that only the head of the case lies above the case plate.

The case plate 20 having the cases seated therein is now placed on top of the assembly plate 24 and oriented so that the cases 11 with the holes therein are placed in contact and juxtaposition with the carbide pins which extend into the assembly plate. A back up plate of stiff rigid material is now placed on top of the case plate and the entire combination of plates now in contact with each other including the back up plate against the heads of the cases is inverted. A hammer blow is delivered to the back up plate which lies against the carbide pins causing the pins to be firmly seated in the noses of the cases. Since the pins are now firmly seated in the noses of the cases, the intermediate plate 26 may now be removed and the pins will retain their position in an upright manner in the noses of the cases. The intermediate plate 26 is now removed and the case plate 20 and assembly plate 24 together as a unit are slid into a press, in which sliding process, the cases are slid off of the back up plate which is against their heads and are slid onto the base of the press. The press is now activated, the pins 8 are forced into the cases 10 to their permanent positions within the cases and as the plates are slid out of the press, the finished pieces comprising cases having tungsten carbide pins permanently and fixedly assembled therein, automatically fall free.

In accordance with another embodiment of our invention, the case plate and the assembly plate could be permanently secured to each other or be formed from a common piece of metal. In this embodiment the combination case plate and assembly plate is filled with cases and then set on top of the intermediate plate holding pins with the smaller ends of the pins upward. The plates as a unit are inverted and the pins tapped to seat them in the cases.

In accordance with another embodiment of our invention, the assembly plate may be dispersed with altogether. If the tolerances of the case plate and the intermediate plate are held sufficiently small, the pins will be centered toward the noses of the cases with sufficient accuracy by the action of the intermediate plate and the case plate. If stops are then provided on the press for gauging the distance which the press drops then the gauging action of the assembly plate will not be required.

The gauging of the press may be accomplished by gauging the thickness of the case plate so that the noses of the cases are below the surface of the case plate a distance equal to the length desired for the pins to extend beyond the noses of the cases.

What we claim is:

1. Assembly apparatus for seating tapered vehicle stud pins in vehicle cases comprising: a pin back plate, an intermediate plate having a plurality of holes therethrough of constant diameter slightly greater than the largest diameter of said pins, an assembly plate having a plurality of holes therethrough of varying cross section along their length, one end of said holes being shaped to fit the nose of said cases and the other end of said holes being shaped to receive said pins and provide a gauge to determine the distance which the pins shall extend beyond the cases in the finished product, said assembly plate being in juxtaposition with said intermediate plate and with the respective holes of each corresponding, and having the smaller portions of the holes of said assembly plate toward said intermediate plate, and a case plate having a plurality of holes therein formed to fit closely around the sides of cases extending thereinto disposed in juxtaposition with and with holes oriented to correspond with the holes in said assembly plate, and a case back up plate adjacent said case plate on the side of said case plate away from said assembly plate.

2. Final assembly apparatus for completely inserting vehicle stud pins in vehicle stud cases comprising: a back up plate, an assembly plate having a plurality of holes therethrough of varying cross section along their length, one end of said holes being shaped to fit the nose of said cases and the other end of said holes being shaped to receive and maintain the orientation of said pins and provide a gauge to determine the distance which the pins shall extend beyond the cases in the finished product, said assembly plate being in juxtaposition with said back up plate and having the smaller portions of the holes of said assembly plate toward said back up plate, and a case plate having a plurality of holes therein formed to fit closely around the sides of cases extending thereinto disposed in juxtaposition with and with holes oriented to correspond with the holes in said assembly plate, and a back up plate adjacent said case plate on the side of said case plate away from said assembly plate.

3. Process for assembly of aluminum cases with carbide pins therein comprising the steps of: orienting the carbide pins in holes in a carbide shaker plate; placing an intermediate plate on top of the carbide pin shaker plate in juxtaposition with said shaker plate, said intermediate plate having holes therethrough of a diameter larger than the largest diameter of said pins and organized in location to coincide with holes in said shaker plate, placing a pin back up plate on top of and in juxtaposition with said intermediate plate, inverting as a unit all three of said plates; removing said carbide shaker plate and placing an assembly plate on top of said intermediate plate, said assembly plate having holes therethrough of a diameter larger than the largest diameter of said pins and organized in location to coincide with holes in said intermediate plate, said assembly plate having its holes enlarged in diameter over the upper part of their length so as to receive the noses of said cases, the smaller diameter portion of the holes in the assembly plate being against said shaker plate, placing a case plate on top of said assembly plate, said case plate having holes therethrough oriented to cooperate with holes through said intermediate plate and said assembly plate and holding cases with their noses toward said carbide pins so as to receive said carbide pins thereinto and therethrough, placing a case back up plate against the heads of said cases, striking a back up plate, removing the intermediate plate and pressing said pins in said cases.

4. Process for assembly of aluminum cases with carbide pins therein comprising the steps of:
  (a) orienting the carbide pins in a carbide pin shaker plate;
  (b) placing an intermediate plate on top of the carbide pin shaker plate in juxtaposition with said shaker plate;
  (c) placing a back up plate on top of and in juxtaposition with said intermediate plate;
  (d) inverting as a unit all three of said plates, being the carbide shaker plate, the intermediate plate and the back up plate;
  (e) removing said carbide shaker plate;
  (f) placing an assembly plate on top of said intermediate plate, said assembly plate having holes therethrough of a diameter larger than the largest diameter of said pins and organized in location to coincide with holes in said intermediate plate, said assembly plate having a portion of each hole enlarged in diameter so as to receive the noses of said cases, the smaller diameter portion of the holes in the assembly plate being against said shaker plate;
  (g) placing a case plate on top of said assembly plate, said case plate having holes therethrough oriented to cooperate with the holes through said intermediate plate and said assembly plate and holding cases with their noses toward said carbide pins and constructed to receive said carbide pins thereinto and therethrough;
  (h) pressing said pins into frictional engagement with said cases;
  (i) removing the intermediate plate; and
  (j) pressing said pins in said cases.

5. Process for assembly of aluminum cases with carbide pins therein comprising the steps of:
  (a) orienting the carbide pins in holes in a carbide pin shaker plate;
  (b) placing an assembly plate on top of said shaker plate, said assembly plate having holes therethrough of a diameter larger than the largest diameter of said pins and organized in location to coincide with holes in said shaker plate, said assembly plate having a portion of each hole enlarged in diameter so as to receive the noses of said cases, the smaller diameter portion of the holes in the assembly plate being against said shaker plate;
  (c) placing a back up plate on top of and in juxtaposition with said assembly plate;
  (d) inverting as a unit all three of said plates, being the carbide shaker plate, the assembly plate and the back up plate;
  (e) removing said carbide shaker plate;
  (f) placing a case plate on top of said assembly plate, said case plate having holes therethrough oriented to cooperate with the holes through said assembly plate and holding cases with their noses toward said carbide pins and constructed to receive said carbide pins thereinto and therethrough; and
  (g) pressing said pins in said cases.

6. Process as described in claim 5 characterized in that the shaker plate has holes therein which are tapered with the larger diameter nearest the surface of the plate.

7. Process as described in claim 5 characterized in that said pins are round and tapered and the holes in said shaker plate have a diameter, near the surface of said plate, less than the diameter of the larger end of said pins.

8. Assembly apparatus for assembling tapered vehicle stud pins in vehicle stud cases comprising: a pin back up plate; an intermediate plate having a plurality of holes therethrough of constant diameter slightly greater than the largest diameter of said pins located against and in juxtaposition with said back up plate; and a case plate having a plurality of holes therethrough formed to fit closely around the sides of cases extending thereinto, disposed in juxtaposition with and with holes oriented to correspond with the holes in said intermediate plate, and a case back up plate adjacent said case plate on the side of said case plate away from said intermediate plate.

9. Process for assembly of aluminum cases with carbide pins therein comprising the steps of:
  (a) orienting the carbide pins in a carbide pin shaker plate;
  (b) placing an intermediate plate on top of the carbide pin shaker plate in juxtaposition with said shaker plate; said intermediate plate having a plurality of holes therethrough of a diameter slightly greater than the diameter of said pins and being of a thickness less than the length of said pins;
  (c) placing a back up plate on top of and in juxtaposition with said intermediate plate;
  (d) inverting as a unit all three of said plates, being the carbide shaker plate, the intermediate plate and the back up plate;
  (e) removing said carbide shaker plate;
  (f) placing a case plate on top of said intermediate plate, said case plate having holes therethrough oriented to cooperate with the holes through said intermediate plate so as to receive pins therefrom and holding cases with their noses toward said carbide pins and constructed to receive said carbide pins thereinto and therethrough;
  (h) slightly seating said pins in said cases;
  (i) removing the intermediate plate; and
  (j) pressing said pins to the final position in said cases.

10. Process for assembling tapered hard metal pins into soft metal cases to form vehicle tire studs comprising the steps of:
  (a) placing a plurality of cases having preformed axial holes partially therethrough in a plurality of individual holes in a plate of rigid material;
  (b) inserting the small end of said pins a short distance into the nose of said cases so that they are held upright by said cases;
  (c) placing said plate with said cases in a press and pressing said pins into said cases until said pins are firmly embedded in said cases and extend beyond said cases a distance less than one quarter of their length.

References Cited
UNITED STATES PATENTS

| | | |
|---|---|---|
| 2,143,518 | 1/1939 | Kolin. |
| 2,510,555 | 6/1950 | Christie. |
| 2,652,876 | 9/1953 | Eisner _____ 152—210 |
| 2,853,770 | 9/1958 | Thorn et al. _____ 29—235 X |
| 3,061,919 | 11/1962 | Tack _____ 29—428 |
| 3,238,609 | 3/1966 | Nichols. |
| 3,241,222 | 3/1966 | Timmermans. |

CHARLIE T. MOON, *Primary Examiner.*